Dec. 17, 1935.  O. R. SWEENEY ET AL  2,024,954
METHOD OF SEPARATING PRODUCTS OBTAINED IN THE OXIDATION OF HYDROCARBONS
Filed Sept. 13, 1933  2 Sheets-Sheet 2
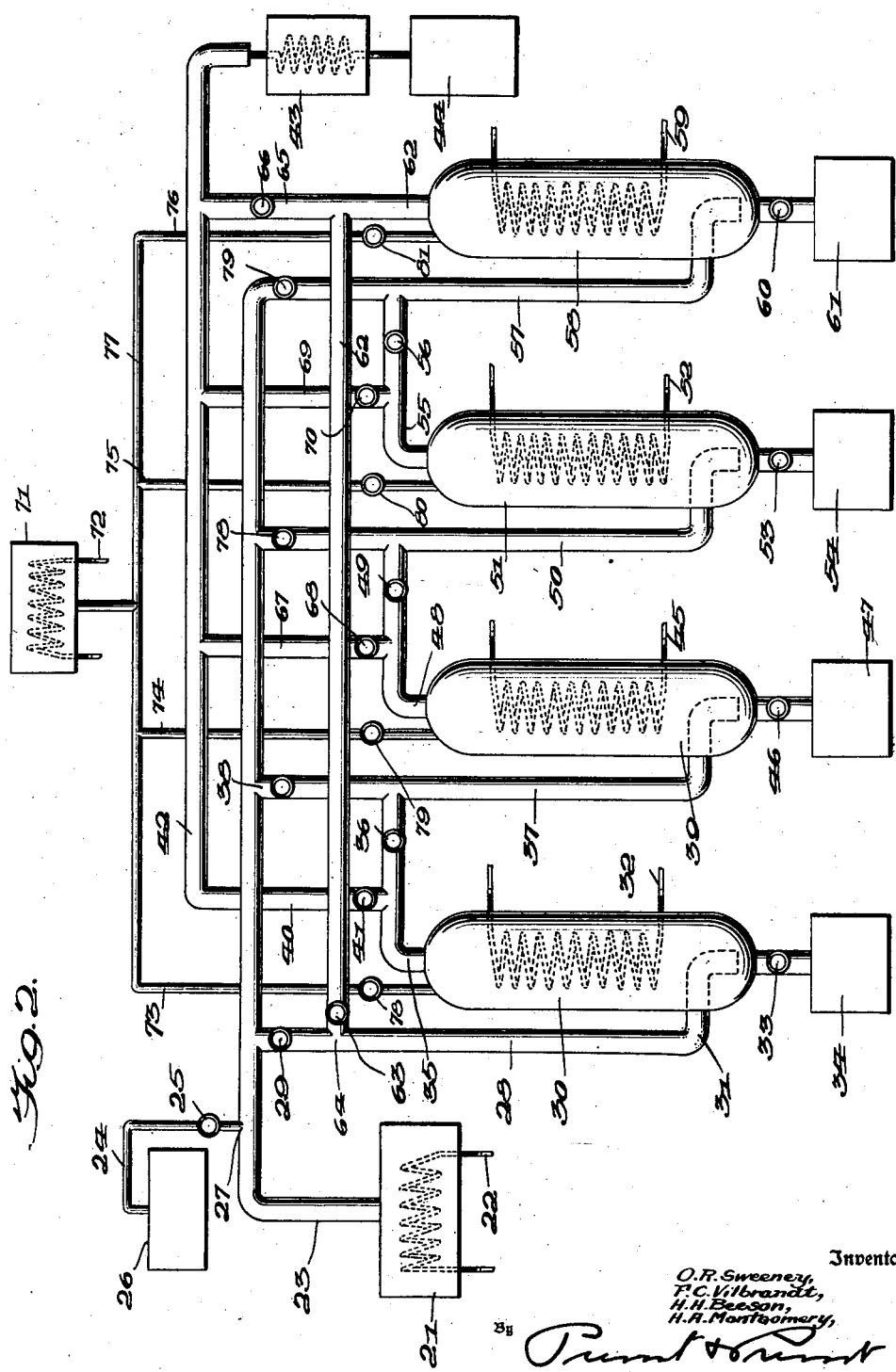

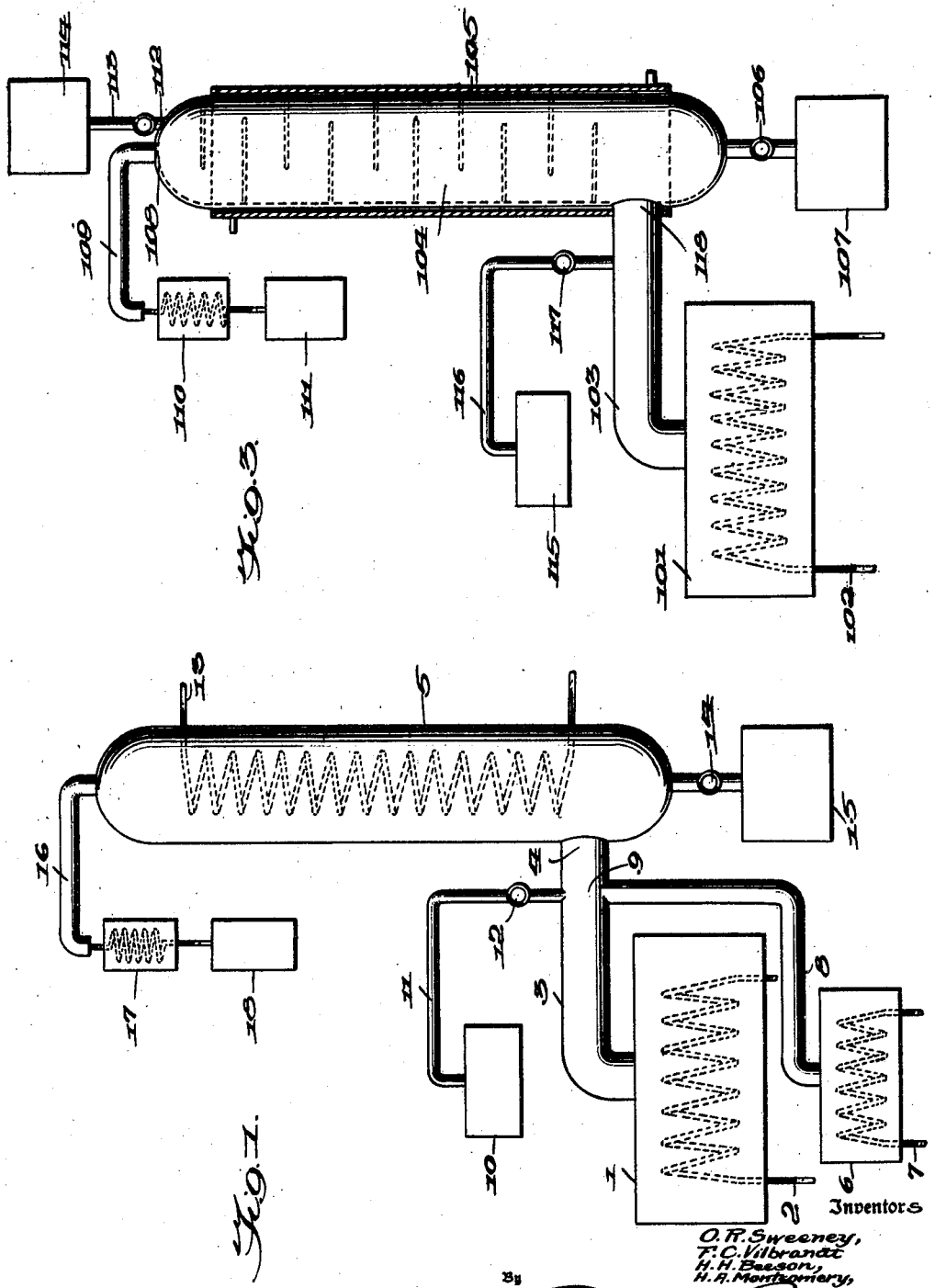

Patented Dec. 17, 1935

2,024,954

UNITED STATES PATENT OFFICE

2,024,954

METHOD OF SEPARATING PRODUCTS OBTAINED IN THE OXIDATION OF HYDROCARBONS

Orland R. Sweeney, Frank C. Vilbrandt, Henry H. Beeson, and Howard A. Montgomery, Ames, Iowa, assignors to Hanlon-Buchanan, Inc., Tulsa, Okla.

Application September 13, 1933, Serial No. 689,326

18 Claims. (Cl. 260—116)

The present invention relates to a process for the treatment of oxidized low-boiling petroleum products whereby products which are of great technical and commercial value may be recovered. The prior art comprises a great variety of processes relating to the oxidation of the more volatile fractions of petroleum by means of oxygen from the air or from other sources. Regardless of the specific character of the oxidation process, the resulting oxidation product comprises, as indicated by analysis, a mixture of alcohols, aldehydes, ketones, fatty acids, and other primary oxidation products, together with products resulting from the interaction of the primary products. Although a large number of oxidation processes of this character has been proposed, few have met with success, and these only to a moderate extent. This is largely due to the fact that there were no cheap and satisfactory methods of separating the oxidation products into their components or into fractions adapted to be used in present-day arts and industries.

A successful method of effecting this separation by admixing the oxidation products in the liquid phase with phenol or phenolic bodies under carefully regulated conditions has been described in application for patent, Serial No. 629,394, filed by Orland R. Sweeney, Frank C. Vilbrandt and Henry H. Beeson, on Aug. 18, 1932. The action of the phenol body, in the aforesaid method, is to combine with the aldehyde and certain other products present in the oxidation mixture to form condensation products. From these condensation products, the unreacted constituents can be physically separated, as by distillation or by decantation. The residual condensation products, when properly treated in the manner disclosed in the aforesaid application, constitute valuable products adapted to be used as molding compounds, or in general, as a substitute for the large number of materials widely used in the industries under the designation of plastics or resinous materials.

The present invention relates to a further inventive concept in this connection, and is the result of further investigation relative to the utilization of the oxidation products resulting from the treatment of the volatile petroleum fractions with air or other oxidizing media. While a preferred material for use in connection with the present invention is the admixture of oxidized hydrocarbon products produced in accordance with the process described in application for patent, Serial No. 631,922, filed by Joseph E. Bludworth, Orland R. Sweeney and Frank C. Vilbrandt, on Sept. 6, 1932, the present invention is by no means limited to this particular process of producing the oxidation product, but may equally as well be applied to any other of the processes that yield mixtures of the aforedescribed character.

The process set forth in application Serial No. 631,922, consists, briefly stated, essentially of cycling a quantity of inert gases in a closed ring, and injecting a suitable quantity of air or other oxidizing medium and hydrocarbon gas into this cycling vehicle, after which the mixture is passed through a reaction zone and thence to a condenser where the condensible oxidized products are removed by condensation, while the inert gases, having been denuded of practically all the hydrocarbon content, continue to cycle through the ring. Proper equilibrium is maintained in the system by venting a quantity of the inert gases and nitrogen from the system at a predetermined point in the ring.

In its essence, the process of the present invention consists of a treatment of the oxidized products in the vapor phase. To this end, the treating apparatus of the present invention may be attached directly to a cycling process, such as that aforedescribed, causing the uncondensed products to pass up through a suitable reaction chamber or tower, where they are commingled with phenol which is either in the vapor phase, in the liquid or fused phase, or dissolved in a suitable solvent.

Alternatively, and instead of making the treating apparatus a part of the cycling process or of the apparatus wherein the oxidation of the hydrocarbon material is effected, the partially oxidized hydrocarbon material may be first condensed, transported to a storage tank, and conducted from the latter to a still in the desired amounts. After vaporizing the oxidized product in the still, it is caused to commingle in the vapor phase with phenol which, as in the prior modification of the process, may be either in the vapor phase, in the molten or liquid phase, or in solution in a suitable solvent.

The advantage of using the vapors directly in the process is that there is less time for secondary reactions to take place between the primary products, and consequently, a larger percentage of free aldehyde is present. Moreover, the storage tank and still are not required. A further economy is effected due to the fact that less cooling water is required. The advantage of first condensing the oxidation products and then treating them separately lies in the fact that the process is more readily controlled. The principle of the two methods, however, is the same, and both modifications have been practiced successfully. For purposes of convenience in setting forth the invention, the following examples have been limited to the second method.

The accompanying drawings are diagrammatic representations of apparatus which may be used in carrying out the invention, and are merely illustrative in character. In the said drawings, Fig. 1 is a diagrammatic showing of one form of apparatus, particularly adapted for use with phenol in the vapor phase.

Fig. 2 is a diagrammatic illustration of a second form of apparatus, particularly adapted for use with phenol in the molten or fused phase, and Fig. 3 is a diagrammatic view of a third embodiment of apparatus, more especially adapted for use in carrying out the process with phenol dissolved in a suitable solvent.

Referring first to the form of invention shown in Fig. 1, reference character 1 designates a still which may conveniently consist of a tank containing a coil 2, through which steam or other heating medium may be passed in regulable manner. Outlet pipe 3 extends from the top of still 1 to inlet 4 of reaction chamber 5 adjacent the lower end of the latter. From a second still 6 which contains a heating coil 7, an outlet pipe 8 connects with outlet pipe 3 of still 1 at junction 9 just anterior to inlet 4 into reaction chamber 5. Storage tank 10 is provided with an outlet pipe 11 which extends from the tank to junction 9, pipe 11 being provided with a regulating valve 12. Reaction chamber 5 is fitted with coil 13, whereby a suitable temperature may be maintained in said chamber by passing a heating medium through the coil. The outlet at the bottom of reaction chamber 5 is valved at 14, receiver 15 being provided so that material may be withdrawn. Vapor pipe 16 extends from the top of reaction chamber 5 to condenser 17 and receptacle 18.

The mixture of partially oxidized hydrocarbon material which is to be processed, and which may be produced in accordance with the disclosure of application Serial No. 631,922, aforedescribed, or in any other suitable and desirable manner, is charged in measured amounts into still 1, which is heated in such manner that the material is vaporized and passes into reaction vessel 5 at a predetermined rate. In still 6, phenol is vaporized at a rate such that the molal ratio of aldehydes in the oxidation product and of the phenol will be approximately 1:1 (one to one), although this ratio may vary somewhat depending upon the quality of the partially oxidized hydrocarbon product. A small quantity of catalyst, for example, gaseous ammonia or the like, is introduced through line 11. The temperature of reaction chamber 5 is maintained at a temperature which has been found to be satisfactory for carrying out the desired reaction, namely, condensation of the phenol with the aldehydic and certain other constituents of the admixture of oxidation products. A satisfactory temperature range for this purpose is 50° C. to 150° C.; the preferred temperature is about 75° C. At this temperature, part of the unreacted oxidation vapors, such as methyl alcohol, acetone and the like, and volatile products of the condensation reaction, will remain in the vapor state and pass out through outlet 16 into condenser 17 where they will liquefy and collect in receiving receptacle 18. These products may be directly used as a solvent, or they may be subjected to further treatment. Another portion of the unreacted material will liquefy at the aforesaid temperature and will settle to the bottom of reaction chamber 5 together with the condensation reaction product. This admixed mass is withdrawn through valve 14 and is subjected to a second distillation in a separate still, where the volatile portion is distilled off. This portion consists largely of alcohols, ketones, and water, and generally some of the higher aldehydes as well.

The effect of this treatment is very prefound since the constituent which gives the most trouble in the fractionation of the oxidation product into its component parts is formaldehyde, and in this vapor phase reaction essentially all the formaldehyde reacts with the phenol and is bound as condensation product.

If desired, the products of distillation from the phenol condensation product may be subjected to a second treatment in the vapor phase with additional phenol for the purpose of eliminating last traces of formaldehyde from the distillates or for converting last traces of formaldehyde and other products of aldehydic nature into condensation products.

The exemplary form of apparatus illustrated in Fig. 2 of the drawings includes a still 21, which is fitted with a coil 22 through which steam or other heating medium may be passed in controlled amount. The outlet from still 21 is by way of pipe 23. Pipe 24, valved at 25, extends from tank 26 to a junction 27 thereof with pipe 23. Another pipe 28, valved at 29, extends from pipe 23 and projects into reaction chamber 30 at a point 31 adjacent the lower end of said chamber, the lowermost end of pipe 28 being bent downwardly as shown in the drawings, so that vapors passing through this pipe will bubble through any liquid which may be in the bottom of reaction chamber 30. The latter is provided with a coil 32 through which steam or other suitable heating medium may be passed. Valved drain 33 is provided at the bottom of reaction chamber 30 to enable the product to be withdrawn from time to time into receptacle 34.

At the top of the reaction chamber, an outlet pipe 35, valved at 36, connects the reaction chamber with pipe 37, valved at 38, and extending to a point adjacent the bottom of reaction chamber 39, the lower end of pipe 37 being constructed and arranged in a manner similar to that of the lower end of pipe 28, aforedescribed.

Outlet pipe 35 is provided with branch pipe 40 which is valved at 41 and extends to pipe 42 leading to condenser 43 and accumulator receptacle 44. By closing valve 36 and opening valve 41, direct communication is provided from reaction chamber 30 to the aforesaid condenser 43 and accumulator 44. Reaction chamber 39 is fitted with a heating coil 45 and with a drain 46 communicating with receiving vessel 47. Outlet pipe 48 of reaction chamber 39 is valved at 49 and joins pipe 50 which extends substantially to the bottom of the reaction chamber 51. The latter is similar in construction to the first two reaction chambers, and is provided with a heating coil 52, a drain 53, and a receiving vessel 54. Outlet pipe 55 of reaction chamber 51 is valved at 56 and is similarly connected through pipe 57 into the bottom of a fourth reaction chamber 58 which, like the others, has a heating coil 59, a drain 60, and a receiving vessel 61. Outlet pipe 62, valved at 63, is connected at junction 64 with pipe 28 which extends into the first reaction chamber 30. A branch 65, valved at 66, extends from pipe 62 to pipe 42 which leads to condenser 43. In like manner, the outlet of reaction chamber 39 is connected to condenser 43 by a connecting pipe 67, valved at 68, and extending into pipe 42. Outlet 55 of reaction chamber 51 is similarly connected to condenser 43 by a pipe 69, which is valved at 70.

A storage tank 71 is fitted with a suitable heating coil 72. Liquid may be supplied from this tank 71 to the several reaction chambers through valved pipes 73, 74, 75 and 76, valved at 78, 79, 80 and 81, respectively, which are severally connected to the reaction chambers and to manifold 77 which communicates with tank 71. The latter acts as a storage receptacle for molten phenol, which is the form utilized in this embodiment of the invention.

In operation, the several reaction chambers are charged with the requisite quantity of molten phenol from tank 71 by means of manifold 77 and the several supply pipes 73, 74, 75 and 76. The fourth reaction chamber 58 is not utilized at the outset, but is connected into the system as soon as the first reaction chamber 30 is ready to be emptied.

The volatile oxidation product is charged into still 21 which is heated by heating coil 22 so that the oxidation product vaporizes and the vapors pass out through pipe 23 into which a small amount of catalyst, such as ammonia, is added from storage tank 26 through pipe 24 and valve 25. The mixture of vapors and catalyst passes through valve 29 and pipe 28 and bubbles through the molten phenol in reaction chamber 30. Here a reaction of the condensation type takes place between the phenol and the aldehydes and certain other portions of the oxidized hydrocarbon vapors. The reaction chamber is maintained at the optimum temperature for carrying out the desired reaction. As in the previously described embodiment of the invention, a suitable range extends from 50° C. to 150° C.; the preferred temperature is 75° C.

Solid catalysts, such as hexamethylene tetramine and the like, may be dissolved in the phenol in tank 71, from whence they are introduced with the phenol or phenolic bodies into the reaction chambers.

Valves 63, 38, 78 and 79 are closed. Unreacted vapors pass from reaction chamber 30 through outlet pipe 35 and valve 36 into pipe 37 and into the bottom of reaction chamber 39, valve 41 being closed. In this manner, the vapors are caused to bubble through the molten phenol in the bottom of the second heated reaction chamber 39 where a further quantity of the reactable oxidation vapors reacts to form additional condensation product. Uncondensed vapors from the second reaction chamber are discharged through pipe 48 and valve 49 into pipe 50 and thence into the bottom of the third reaction chamber 51 where any remaining unreacted but slowly reactable oxidized hydrocarbon may combine with the molten phenol. During this time, valve 68 is also closed.

After passage through the three reaction chambers, substantially all the reactable portions of the oxidized hydrocarbon vapors have combined with the phenol, so that the vapors which leave reaction chamber 51 consist essentially of alcohols and ketones. The vapors pass through pipe 55, valve 70, pipe 69 and pipe 42 into condenser 43 where the condensable vapors are liquefied and collect in receiver 44, valve 56 being closed.

Before withdrawing the condensation product from reaction chamber 30, the latter is shut off from the system and reaction chamber 58 is cut in. Valves 66 and 56 are opened and valve 70 is closed, thus forcing exit vapors from reaction chamber 51 to enter heated reaction chamber 58 and bubble through the molten phenol therein instead of going directly to the condenser 43. From the top of reaction chamber 58, the vapors enter condenser 43 through pipes 62, 65 and 42. Valve 38 is opened and valves 29 and 36 are closed, causing the fresh oxidized vapors to pass directly into reaction chamber 39.

To remove the charge from reaction chamber 30, valve 33 is opened, allowing the condensation product to flow into the receiver 34 together with some of the liquefied oxidized hydrocarbon vapors, such as higher alcohols, water, and the like. After all the material has been drained out of the reaction chamber, valve 33 is closed and the valve in line 73 opened permitting a batch of fresh phenol to be charged into the reaction chamber.

When all the phenol in reaction chamber 39 is used up, reaction chamber 30 is cut into the system as the last reaction chamber of the series by opening valve 41 in pipe 40 and valve 63 in pipe 62. Valve 66 is closed, forcing the exit vapors from reaction chamber 58 to flow into reaction chamber 30. Reaction chamber 39 is then disconnected in a manner similar to that described for reaction chamber 30, and is discharged and re-charged with a fresh batch of phenol. By this time, reaction chamber 51 is ready to be disconnected so that reaction chamber 39 is connected to exit pipe 35 of reaction chamber 30 in a manner similar to that hereinbefore described, and reaction chamber 51 is discharged and re-charged with phenol. Similarly, reaction chamber 58 is disconnected and reaction chamber 51 connected to the exit pipe of reaction chamber 39.

In this manner the operation is carried out in the so-called batch countercurrent method. By this arrangement, the fresh oxidized petroleum vapors come into contact with the most nearly exhausted phenol and the lean vapors meet the fresh phenol at the end, thus causing a more complete reaction between the phenol and the aldehydes and certain other reactable products in the vapors.

While the aforedescribed countercurrent method is preferred, any other device whereby vapors of the oxidized petroleum fraction are commingled with molten phenol may be employed. Thus, it is possible to use a continuous process wherein molten phenol is fed into the top of a reaction chamber and the reacted products are continuously withdrawn from the bottom.

The product withdrawn from the several reaction chambers may be subjected to a further distillation at suitable temperature to remove oxidized hydrocarbons which may have been entrained and, if necessary, to remove any uncombined phenol. This further distillation may be carried out under vacuum if desired. The product is then adapted for use as a molding material and the like.

The apparatus illustrated in Fig. 3 of the drawings is particularly adapted for carrying out the reaction using phenol in solution in a suitable solvent. A still 101 is fitted with a coil 102 through which steam or other heating medium may be passed. Pipe 103 connects the top of the still to inlet 118 adjacent the bottom of reaction chamber 104. The latter consists essentially of a vertical column provided with a series of horizontally arranged baffles, staggered as illustrated. A heating jacket 105 is provided. The bottom of the reaction chamber 104 is fitted with a drain 106 discharging into receptacle 107. Pipe 109 extends from outlet 108 of reaction chamber 104 to condenser 110 and receptacle 111. At another point 12 above the uppermost baffle plate, pipe 113 connects with storage tank 114. Tank 115 is connected by pipe 116 to pipe 103 through regulating valve 117.

The above baffle apparatus in the reaction chamber may be replaced with bubble plates or any other type of absorption tower arrangement.

A charge of partially oxidized petroleum fraction or other similar hydrocarbonaceous material is volatilized in still 101, and the vapors in admixture with a small quantity of catalyst, preferably ammonia, from tank 115 pass through pipe 103 into the bottom of the reaction chamber 104, or a suitable solid catalyst may be dissolved in the phenol or phenolic bodies and the solvent, and then introduced into the reaction chamber with the phenol or phenolic bodies. Tank 114 contains phenol dissolved in a suitable solvent which is fed from this tank into the top of the reaction chamber at point 112. This solution flows down over the baffles in the reated reaction chamber 104 coming into contact with the ascending vapors in countercurrent manner. The phenol reacts with part of the oxidized vapors to form a condensation product which collects at the bottom of the reaction chamber and may be withdrawn through outlet 106 into the receiver 107. If a suitable amount of solvent has been employed to dissolve the phenol, the reacted product will remain in solution and may be withdrawn without difficulty. Suitable solvents for the aforedescribed purpose comprise acetone, the various alcohols, such as methyl, ethyl or propyl, and in particular a portion of the material which is distilled away from the condensation product itself.

The product of the reaction which is withdrawn continuously from the bottom of the reaction vessel is now passed to storage. The solvent in which this condensation product is dissolved is composed of the solvent used to dissolve the phenol and, in addition, some solvent material which is absorbed from the oxidized vapors. The unabsorbed and unreacted vapors will pass from the reaction chamber through pipe 109 and will be condensed in condenser 110, and will collect in the receiver 111.

The condensation product may subsequently be subjected to a distillation treatment which removes the solvent in which the condensation product is dissolved. If necessary, the latter may be heated to a somewhat higher temperature such for example as 190° C. to eliminate superfluous uncondensed phenol. This is not always necessary, however, as the addition of a small quantity of formaldehyde or hexamethyleneamine will give a phenol-free product. The residue from the distillation treatment is then suitable for a large number of uses in the arts.

If a special solvent is used to dissolve the phenol, this solvent may be separated from the absorbed oxidation vapors and used to dissolve a fresh batch of phenol. However, if the solvent used to dissolve the phenol is a portion of the unreacted liquefied oxidation vapors, a portion derived from the distillation of the condensation product will be used to dissolve a fresh batch of phenol, thus eliminating any second distillation to separate the added solvent not produced in the process. The portion not used to dissolve the phenol is sent to storage where it may be sold directly or further treated to meet the marker demands.

The process comprising the present invention may be carried out, in each of its embodiments hereinbefore described, under pressures lower than atmospheric, at atmospheric or above atmospheric; however, satisfactory results are obtained at atmospheric pressure and this pressure, because of its convenience, is preferred.

While the foregoing disclosure has been specifically applied to phenol, the invention has also been successfully applied to other phenolic compounds, such as higher phenols, cresol and the like.

From the foregoing it is believed that the operation and advantages of our invention may be readily understood by those skilled in the art without further description, it being borne in mind that numerous changes may be made in the details disclosed without departing from the spirit of the invention as set forth in the following claims.

What we claim and desire to secure by Letters Patent is:—

1. The process of separating into constituents thereof, a freshly prepared vapor phase mixture of oxygenated organic compounds containing aldehydes, comprising intimately contacting said vapors with a phenolic body, whereby at least one of said constituents reacts with said phenolic body to form a condensation product adapted for use as a plastic, and physically separating the remaining constituents of said mixture from said condensation product.

2. The process of separating into constituents thereof, a vapor phase mixture containing aldehydes, resulting from the vapor phase oxidation of hydrocarbons comprising intimately contacting said vapors with a phenolic body, whereby at least one portion of said mixture reacts with said phenolic body to form a condensation product adapted for use as a plastic, and physically separating the unreacted portion of said mixture from said condensation product, said vapor phase mixture being utilized directly as derived from the oxidation and without preliminary condensation thereof.

3. The process of separating the products of the oxidation of a mixture of aliphatic hydrocarbons containing aldehydes, comprising vaporizing said products, intimately contacting the resultant vapors with a phenolic body adapted to convert the aldehydic constituents of said vapors into substantially non-volatile form, said conversion being effected at elevated temperature whereby unconverted constituents of said vapors distill off and may be recovered.

4. The process of separating into constituents thereof, a vapor phase mixture of oxygenated organic compounds containing aldehydes, produced by the oxidation of hydrocarbons, comprising bubbling said vapors directly as obtained from said oxidation through molten phenol, whereby at least one of said constituents combines with said phenol to form a non-volatile phenolic condensation product, and physically recovering unreacted constituents of said mixture.

5. The process of separating into constituents thereof, a mixture of oxygenated organic compounds containing aldehydes, comprising vaporizing said compounds, vaporizing a phenolic body, intimately admixing the resultant several vapors whereby certain of said constituents combine with said phenol vapors to form a non-volatile phenolic condensation product, and physically separating uncombined vapors from said condensation product.

6. The process of separating into constituents thereof, a vapor phase mixture of oxygenated organic compounds containing aldehydes, comprising passing the said vapors through a solution of a phenol, whereby those constituents of said vapors which react with said phenol to form a phenolic condensation product are eliminated, and then separating said condensation product from the unreacted vapors.

7. The process of separating into constituents thereof, a mixture of oxygenated organic compounds containing aldehydes, comprising the catalytic vapor phase conversion of the aldehydic and related constituents thereof into substantially non-volatile phenolic condensation products.

8. The method of treating a mixture resulting from the oxidation of petroleum fractions and other hydrocarbonaceous material comprising vaporizing said mixture, intimately contacting the resultant vapors with a solution of phenol in a solvent derived from a previous treatment of the character herein set forth, whereby a substantially non-volatile phenolic condensation product which is adapted to be elaborated into a molding plastic separates out, and maintaining the temperature at such a point that uncondensed vapors distill, recovering the said distilled vapors and utilizing a part of the resultant mixture as the solvent for phenol in a subsequent treatment of the character herein set forth.

9. The method of separating into constituents thereof, a mixture of oxygenated hydrocarbon derivatives including aldehydes, comprising vaporizing said mixture, admixing the resultant vapors with a catalyst, and passing the resultant mixture through a series of batches of molten phenol of increasing concentration, successively cutting each batch out of the series as the phenolic content thereof is exhausted, replacing each cut-out batch by a fresh batch of phenol which is cut in at the end of the series, and separately recovering the resultant phenolic condensation products and the unconverted vapors.

10. The process of separating into constituents thereof, a vapor phase mixture of oxygenated organic compounds, certain of which have an affinity for phenolic bodies, comprising intimately contacting said vapors with a phenolic body, whereby at least one of said constituents reacts with said phenolic body to form a condensation product adapted for use as a plastic, and physically separating the remaining constituents of the mixture from said condensation product.

11. The process of separating the products of the oxidation of a mixture of aliphatic hydrocarbons, certain of the constituents of which have an affinity for phenolic bodies, comprising vaporizing said products, intimately contacting the resultant vapors with a phenolic body adapted to convert at least one of said constituents of said vapors into substantially non-volatile form, said conversion being effected at elevated temperature, whereby unconverted constituents of said vapors distill off and may be recovered.

12. The process of separating into the constituents thereof a vapor phase mixture of oxygenated organic compounds, certain of which have an affinity for phenolic bodies, comprising bubbling said vapors through molten phenol, whereby at least one of said constituents combines with said phenol to form a non-volatile phenolic condensation product, and physically recovering unreacted constituents of said mixture.

13. The process of separating into the constituents thereof a mixture of oxygenated organic compounds, certain of which have an affinity for phenolic bodies, comprising vaporizing said compounds, vaporizing a phenolic body, intimately admixing the resultant several vapors whereby certain of said constituents combine with said phenol vapors to form a non-volatile phenolic condensation product, and physically separating uncombined vapors from said condensation product.

14. The process of separating into the constituents thereof a vapor phase mixture of oxygenated organic compounds, certain of which have an affinity for phenolic bodies, comprising passing said vapors through a solution of a phenol, whereby those constituents of said vapors which react with phenol to form a phenolic condensation product are eliminated, and then separating said condensation product from the unreacted vapors.

15. The process of separating into constituents thereof a mixture of oxygenated organic compounds, certain of which have an affinity for phenolic bodies, comprising the catalytic vapor phase conversion of those constituents which react with phenol, into substantially non-volatile phenolic condensation products.

16. The method of treating a mixture resulting from the oxidation of petroleum fractions and other hydrocarbonaceous material, comprising vaporizing said mixture, intimately contacting the resultant vapors with vapors of phenol, whereby a substantially non-volatile phenolic condensation product which is adapted to be elaborated into a molding plastic separates out, and maintaining the temperature at such a point that uncondensed vapors distill, recovering the said distilled vapors, and utilizing a part of the resultant mixture as the solvent for phenol in a subsequent treatment of the character herein set forth.

17. The process of separating into the constituents thereof, a vapor phase mixture of oxygenated organic compounds, certain of which have an affinity for phenolic bodies, comprising vaporizing a phenolic body, intimately admixing the resultant vapors with said vapors being treated, whereby certain of said constituents combine with said phenol vapors to form a non-volatile phenolic condensation product, and physically separating uncombined vapors from said condensation product.

18. The process of separating into the constituents thereof, a vapor phase mixture of oxygenated organic compounds containing aldehydes, comprising vaporizing a phenolic body, intimately admixing the resultant vapors with said vapors being treated, whereby certain of said constituents combine with said phenol vapors to form a non-volatile phenolic condensation product, and physically separating uncombined vapors from said condensation product.

ORLAND R. SWEENEY.
FRANK C. VILBRANDT.
HENRY H. BEESON.
HOWARD A. MONTGOMERY.